(No Model.) 3 Sheets—Sheet 1.
J. A. PARTRIDGE.
CONTRIVANCE FOR TRAINING GROWING HOP PLANTS.
No. 492,516. Patented Feb. 28, 1893.

Witnesses:
E. B. Bolton
E. K. Sturtevant

Inventor:
James Adams Partridge
By Richards & R.
his Attorneys (No Model.)                                                    3 Sheets—Sheet 2.
J. A. PARTRIDGE.
CONTRIVANCE FOR TRAINING GROWING HOP PLANTS.
No. 492,516.                                      Patented Feb. 28, 1893.
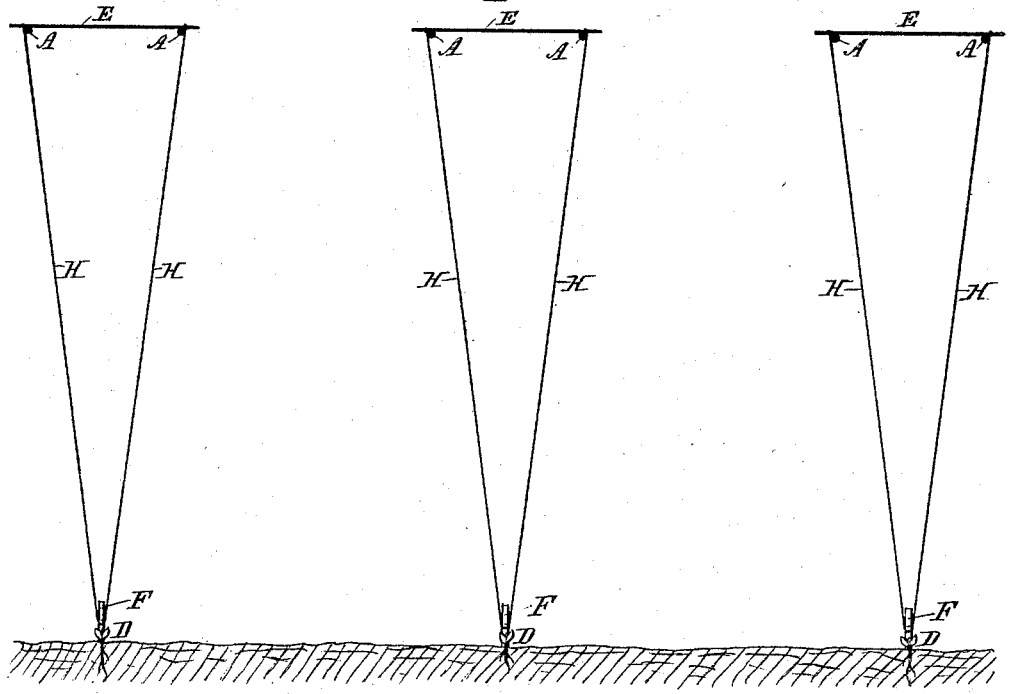
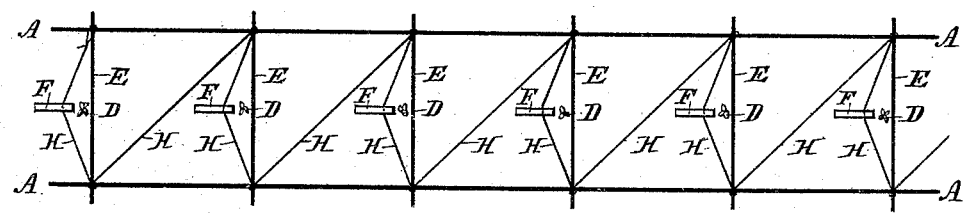
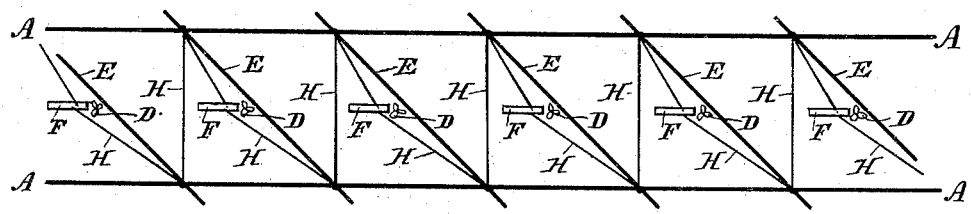
Witnesses:
E. B. Bolton
E. K. Sturtevant.
Inventor:
James Adams Partridge
By Richards & R
his Attorneys.

(No Model.) 3 Sheets—Sheet 3.
J. A. PARTRIDGE.
CONTRIVANCE FOR TRAINING GROWING HOP PLANTS.
No. 492,516. Patented Feb. 28, 1893.
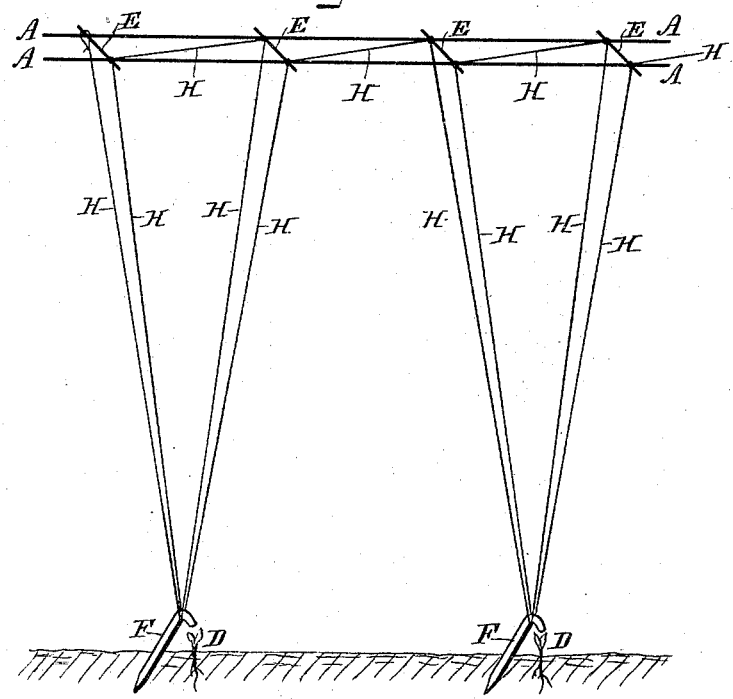
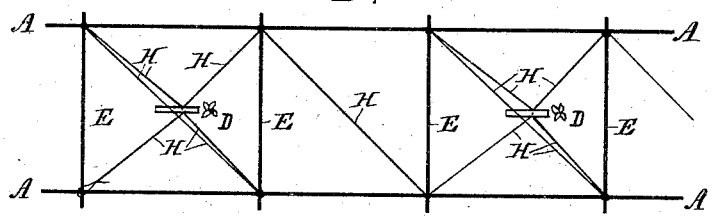
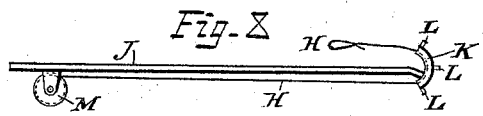
Witnesses:
R. B. Bolton
E. H. Sturtevant
Inventor:
James Adams Partridge
By
his Attorneys.

United States Patent Office.

JAMES ADAMS PARTRIDGE, OF TENBURY, ENGLAND.

CONTRIVANCE FOR TRAINING GROWING HOP-PLANTS.

SPECIFICATION forming part of Letters Patent No. 492,516, dated February 28, 1893.

Application filed July 16, 1892. Serial No. 440,257. (No model.) Patented in England June 12, 1889, No. 9,673.

*To all whom it may concern:*

Be it known that I, JAMES ADAMS PARTRIDGE, farmer and hop-planter, a subject of the Queen of Great Britain and Ireland, and a resident of Woodston House, Tenbury, in the county of Worcester, England, have invented a certain new and useful Contrivance for Training Growing Hop Plants Upon, (for which I have obtained a patent in Great Britain, No. 9,673, bearing date June 12, 1889,) of which the following is a specification.

My invention relates to an improved contrivance for training growing hop plants upon string, cord, wire or other similar material. The main feature of the invention consists in the fact that the said string, cord, or wire can be applied in one continuous length by a person standing on the ground, thus dispensing with the cutting of the said material into short lengths and with the use of ladders, or other erections for fixing it overhead.

Figure 1:
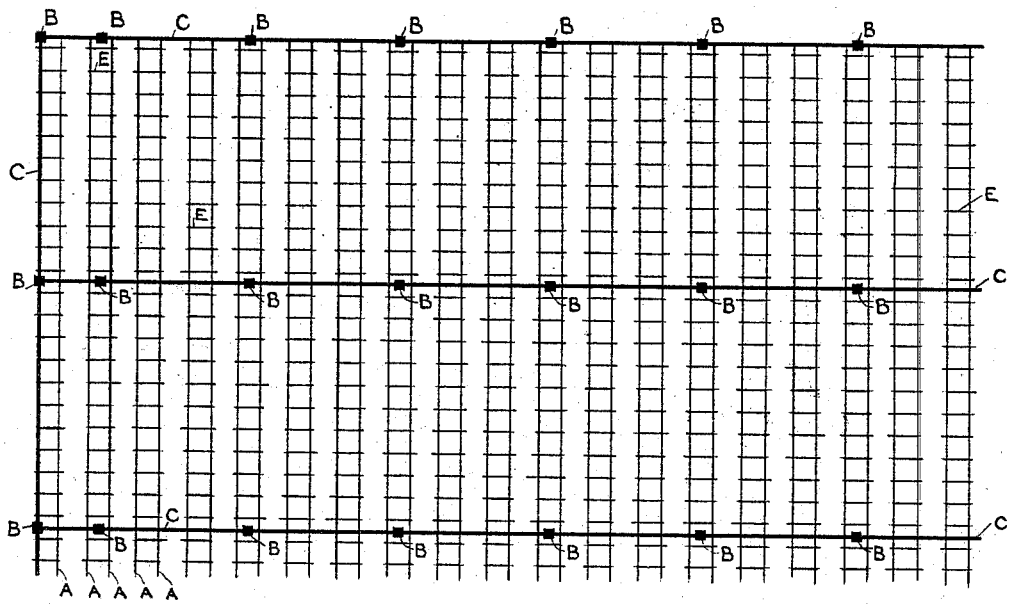
Figure 2:
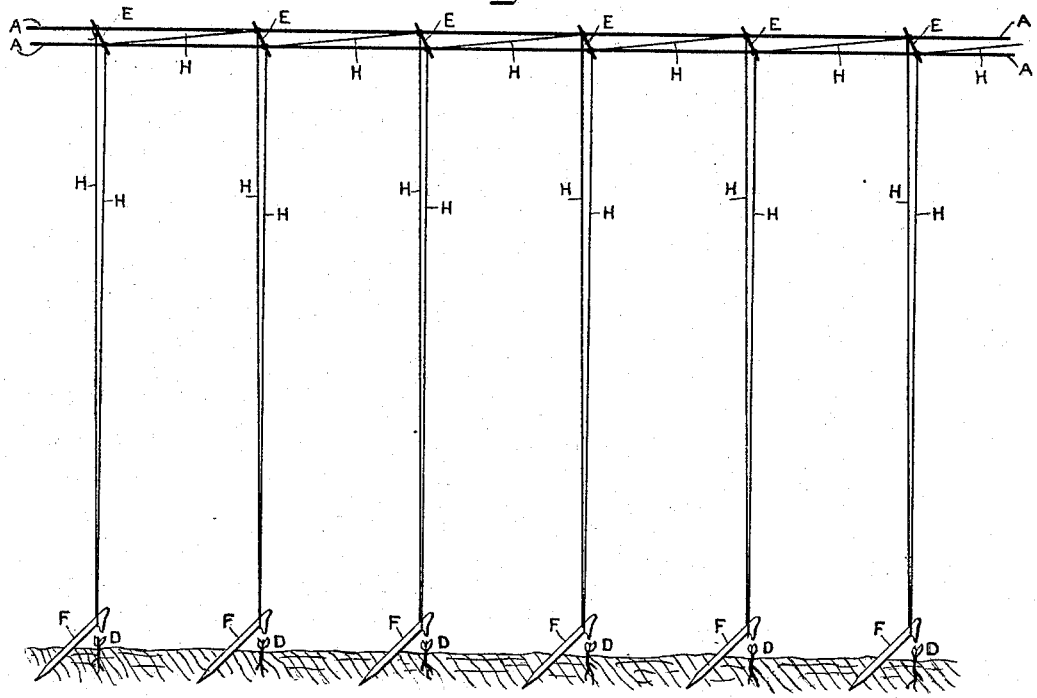

In the accompanying three sheets of drawings, Figure 1 represents a plan of a portion of a hop yard with my invention applied thereto. Fig. 2 is a perspective side elevation to an enlarged scale of a single row. Fig. 3 is a cross-sectional elevation of the rows, and Fig. 4 a plan of same. Fig. 5 is a plan showing a slight modification in the arrangement of the string; and Figs. 6 and 7 are respectively perspective side elevation and plan showing a further modification. Figs. 8 and 9 represent the instrument described as a "stringer" for applying the string or other like material.

Similar letters of reference denote similar parts throughout the drawings.

Over each line or row of hop roots, I stretch two strong wires A, A, at a suitable height from the ground, (say thirteen feet or thereabout) these wires run parallel from end to end of the hop yard, and are placed about three or four feet apart from each other. Strong wooden or iron posts B, are placed at suitable intervals, and carry horizontal cross-pieces or strong wires C, upon which the wires A, A, are stretched and supported, but any other suitable arrangement may be employed for supporting the wires A, A.

At intervals, that is to say immediately over each hop plant D, light cross-pieces E, of wood, iron, or cane are laid and fixed securely on the parallel wires A, A, at right angles thereto, see Figs. 1, 2, 3 and 4. These cross-pieces are of such a length and so fixed that each end projects about two inches beyond the wires A, A, as shown clearly in the plan Fig. 4.

A peg F, having a projecting hook at the upper end, is fixed firmly in the ground, near each hop plant D. The apparatus is then ready for the application of the continuous string, wire, or other like material, which is arranged and fixed in the following manner. The said string or wire, represented by the lines H, being wound in a ball, or on a reel, and carried by, or unwound before the person who applies it, has a loop formed on the end, and by means of the "stringer," see Figs. 8 and 9; this loop is fixed securely to one of the projecting ends of the aforesaid cross-pieces E. The string is then passed under the hook of the peg F, and by the aid of the "stringer" round the opposite end of the same cross-piece E, to which the loop was fastened and secured thereto by passing it from the inward side of the wire A round the projecting end of the cross-piece E, and then bringing it back to the inward side of A, or by a single hitch or other knot that will not slip. Then without cutting or breaking, the string is passed diagonally across to the end of the next cross-piece E, then down to the next hook in the ground as before, and so on to the end of the row.

In the modified arrangement shown in Fig. 5, the cross pieces E are arranged diagonally on the wires A, A, the strings going down to the hooks F being necessarily also diagonal, while the string passes from each cross-piece to the next one at right angles to the wires A, A.

In the arrangement shown in Figs. 6 and 7, which represent what is known as the "Kent system," the hop plants are placed farther apart, so that there are only half the number in each row, as compared with the previous arrangements. Each plant is placed centrally between a pair of cross-pieces E. The string starting from the end of one cross-piece goes down to the hook F, then up to the other end of the same cross-piece, then diagonally to the second cross piece, down again to the same hook, and up to the other end of the cross-piece, then diagonally to the next cross piece, and so on; thus in this system, there are four strings going up from each hook, instead of two as in the other arrangements. If desired, three strings could be used in this plan by commencing to tie the cord to the peg in the ground, and afterward only passing it once under the hook.

The cross-pieces E, are merely of use as a means for holding and securing the string overhead to the wires A, A. The same object may be attained by employing barbed, instead of plain wire, for the said wires A, A, or by fixing hooks upon the said wires, or any other devices may be used which will effect the desired purpose.

The "stringer," shown in Figs. 8 and 9, consists of a wood or cane shaft J, having a head K, formed of iron of a trough section, and bent into a semicircle to receive the string H. Leads or rings L, are fixed on the head K to retain the string in place in the groove. In Fig. 8 a reel M, on which the string is wound, is attached to the shaft J, and in Fig. 9 a basket or case N, to contain a ball of string.

I am aware that an arrangement of parallel wires, similar to A, A, supported upon cross pieces or strong wires C, carried by posts B, has been employed heretofore, short lengths of string being tied to the wires A A, upon which to train the growing hops, and I therefore make no separate claim to the use of the posts B, cross pieces C, nor wires A. A, nor to the use of string *per se* for the purpose of training growing hop plants upon, but:

Having now described my invention, what I claim as new, and desire to secure by Letters Patent, is—

1. In combination, the supporting posts, the wires A, arranged in pairs and suitably supported from said posts, the cross wires E resting on the wires A, the continuous string looped about the wires A, and extending about fastening devices in the ground, the said string serving also to bind the ends of the cross wires to the wires A, which cross wires in turn serve to hold the string at regular intervals along the wires A, substantially as described.

2. In combination, the supporting posts, the wires A, arranged in pairs and suitably supported from said posts, the continuous string looped about the wires A, and extending under hooked pegs F, in the ground, and the means arranged at regular intervals along the wires A, for holding the string by engaging the same, substantially as described.

3. In combination, the pairs of wires A, the means for holding the same, the means for holding the continuous string to the ground, the said string being connected with one wire extending thence to the ground and up to the other wire and thence horizontally across to the first wire and in the same plane with the wires, the said wires being provided at regular intervals with means for engaging and holding the loops of the string against displacement along the wires, substantially as described.

In witness whereof I have hereunto set my hand in presence of two witnesses.

JAMES ADAMS PARTRIDGE.

Witnesses:
 JOSEPH THOMAS,
 WM. A. W. PRICE,
*Clerks to Messrs. H. C. Beddoe & Son, Solicitors, 37 Bridge Street, Hereford.*